(12) United States Patent
Takeda et al.

(10) Patent No.: US 7,284,911 B2
(45) Date of Patent: Oct. 23, 2007

(54) OPTICAL CONNECTOR HAVING A REMOVABLE ADAPTER

(75) Inventors: Jun Takeda, Tokyo (JP); Yuichi Koreeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/256,014

(22) Filed: Oct. 21, 2005

(65) Prior Publication Data

US 2006/0088249 A1   Apr. 27, 2006

(30) Foreign Application Priority Data

Oct. 22, 2004   (JP) ............... 2004-307674

(51) Int. Cl.
*G02B 6/38*   (2006.01)
(52) U.S. Cl. .......................... 385/71; 385/52
(58) Field of Classification Search ................ 385/49, 385/50, 52, 53, 59, 71, 76, 89, 134
See application file for complete search history.

(56) References Cited

U.S. PATENT DOCUMENTS

2003/0198442 A1 * 10/2003 Cheng et al. ................. 385/83

FOREIGN PATENT DOCUMENTS

| CN | 1451982 A | 10/2003 |
| JP | 2843338 | 5/1990 |
| JP | 2004118031 | 4/2004 |

* cited by examiner

*Primary Examiner*—Sarah Song
(74) *Attorney, Agent, or Firm*—Collard & Roe, P.C.

(57) ABSTRACT

In an optical connector for connecting an optical fiber to a mating object having a pair of guide members, the optical connector includes a connector body fixed to the optical fiber and an adapter removably attached to the connector body. The adapter has a positioning groove for positioning an end portion of the optical fiber and a pair of guide grooves adapted to receive the guide members, respectively.

7 Claims, 8 Drawing Sheets

OPTICAL CONNECTOR HAVING A REMOVABLE ADAPTER

This application claims priority to prior Japanese application JP 2004-307674, the disclosure of which is incorporated herein by reference.

BACKGROUND OF THE INVENTION

The present invention relates to an optical connector for use in connecting an optical fiber.

In recent years, there is a strong demand for an increase in capacity of optical communication using an optical fiber. Further, in order to reduce the size of an optical communication apparatus, use is made of a PLC (Planar Lightwave Circuit) comprising a silicon or a quartz substrate and a plurality of optical waveguides integrated thereon. In particular, in DWDM (Dense-Wavelength Division Multiplexing), an AWG (Arrayed Waveguide Grating) as one type of the PLC is used so that optical signals transmitted from a plurality of transceivers and different in wavelength from one another can be transmitted by a single optical fiber.

Traditionally, in order to achieve coupling between a number of optical waveguides on the PLC and a number of optical fibers, a component called a fiber array is sometimes used. The fiber array has a number of V grooves. The optical fibers are disposed in the V grooves of the fiber array, respectively, and adhered and fixed thereto. Then, light is transmitted through the optical fibers in the fiber array and the optical waveguides of the PLC and optical power of the light is monitored. When the optical power becomes maximum, the fiber array is adhered and fixed to the PLC.

The above-mentioned technique is called active alignment. The active alignment requires a power monitor and a device for aligning the optical waveguides and the optical fibers in three directions, i.e., back-and-forth, left-and-right, and vertical directions upon coupling the optical waveguides and the optical fibers. Further, a considerably long operating time is required.

Japanese Patent (JP-B) No. 2843338 discloses another example of coupling optical waveguides and optical fibers. The optical waveguides are formed on an optical waveguide substrate. The optical waveguides have end portions located on the optical waveguide substrate in the vicinity of an end face thereof. On opposite sides of the end portions of the optical waveguides, a pair of guide pins are fixed. Each of the guide pins protrudes from the end face of the optical waveguide substrate by about a half of its length.

On the other hand, an optical fiber plug is fixed to end portions of the optical fibers. The optical fiber plug has a pair of receiving holes formed on opposite sides of the end portions of the optical fibers. By inserting the guide pins into the receiving holes, connection between the optical waveguides and the optical fibers is automatically achieved.

With the above-mentioned structure, it is easy to align the optical waveguides and the optical fibers. However, when the guide pins are inserted into the receiving holes, a part of the optical fiber plug which is adjacent to each receiving hole may be damaged by the guide pin. Upon occurrence of such damage, stable alignment is difficult to perform. In order to perform stable alignment, a whole of the optical fiber plug which has been damaged must be replaced by a new optical fiber plug. This requires a relatively high cost.

SUMMARY OF THE INVENTION

It is therefore an object of this invention to provide an optical connector which is capable of easily aligning an optical fiber and an object to be connected and which does not require a high cost for replacement of a part susceptible to damage.

Other objects of the present invention will become clear as the description proceeds.

According to an aspect of the present invention, there is provided a n optical connector for connecting an optical fiber to a mating object having a pair of guide members, the optical connector comprising a connector body fixed to the optical fiber and an adapter removably attached to the connector body, the adapter having a positioning groove for positioning an end portion of the optical fiber and a pair of guide grooves adapted to receive the guide members, respectively.

DESCRIPTION OF THE PREFERRED EMBODIMENT

DESCRIPTION OF THE PREFERRED EMBODIMENT

Figure 1:
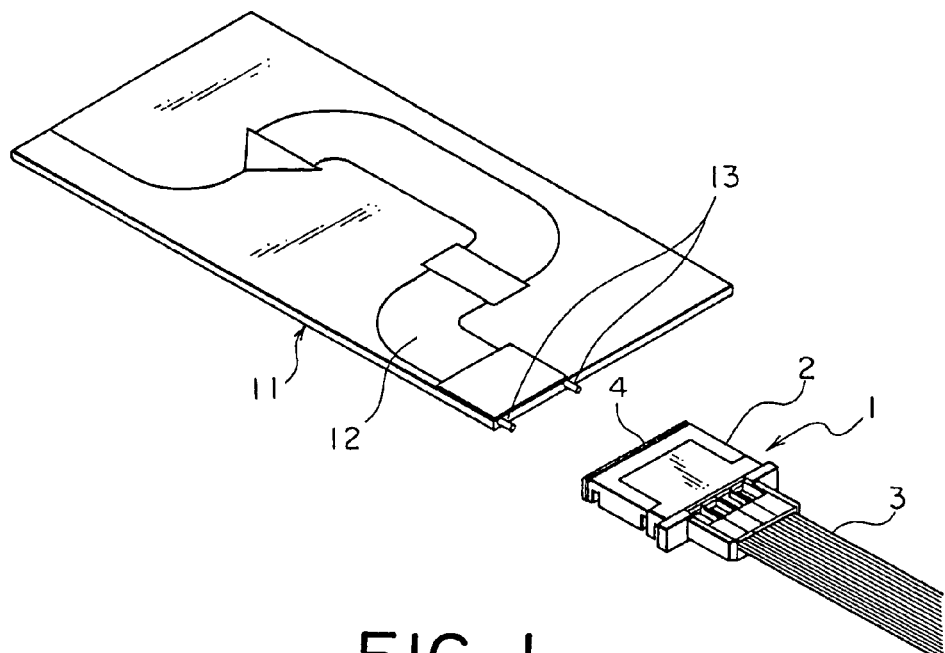
FIG. 1 is a perspective view of an optical connector according to an embodiment of this invention and an optical waveguide substrate in an unconnected state.
Figure 2:
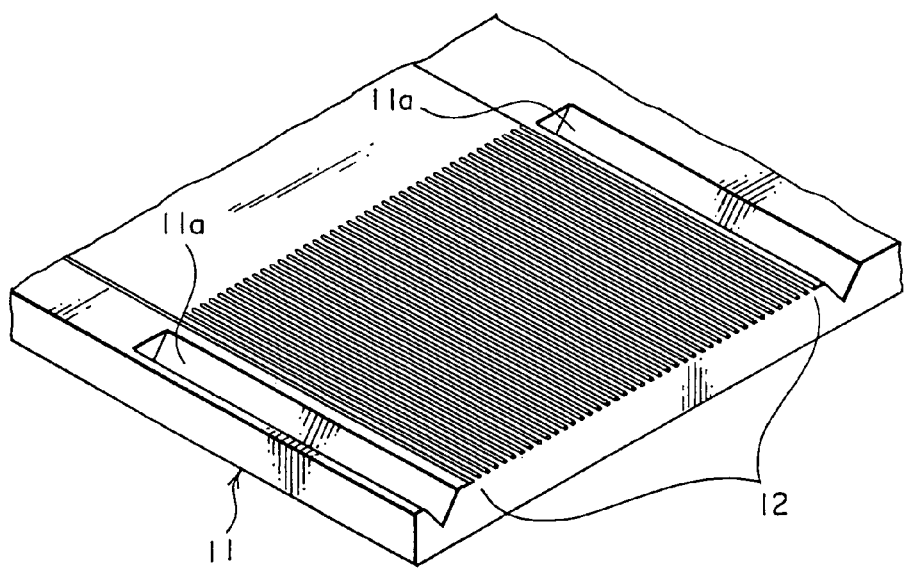
FIG. 2 is an enlarged perspective view of a characteristic part of the optical waveguide substrate.
Figure 3:
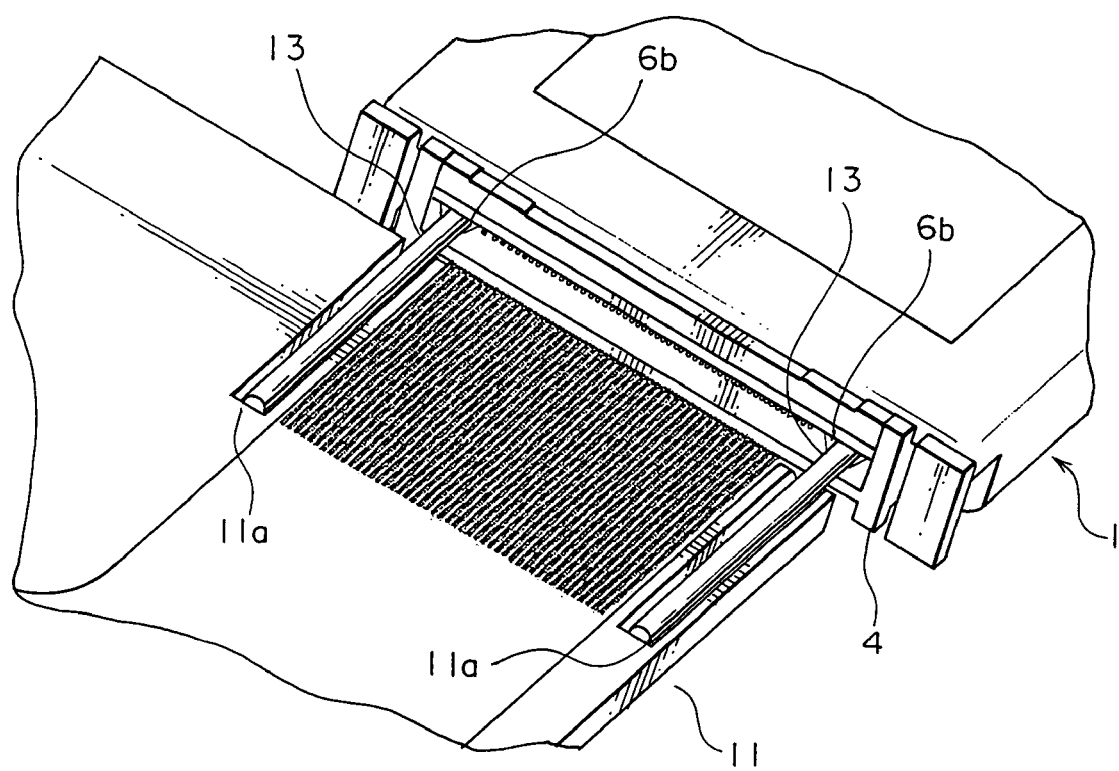
FIG. 3 is a perspective view showing a state immediately before the optical connector and the optical waveguide substrate are connected to each other.

Referring to FIGS. 1 through 3, description will be made of an optical connector according to an embodiment of this invention.

The optical connector depicted at 1 comprises a plug 2 as a connector body and an adapter 4 removably attached to one end of the plug 2. To the plug 2, a number of optical fibers 3 arranged in parallel are attached. The optical fibers 3 are extracted from the other end of the plug 2.

The optical connector 1 is adapted to be connected to an optical waveguide substrate 11. The optical waveguide substrate 11 is provided with a plurality of optical waveguide elements, which are arranged along an upper surface of the optical waveguide substrate 11 and will collectively be called an optical waveguide 12. The optical waveguide 12 has an end portion located in the vicinity of an end face of the optical waveguide substrate 11. The optical waveguide substrate 11 is provided with a pair of guide pins 13 formed on opposite sides of the end portion of the optical waveguide 12. Each of the guide pins 13 has a circular section in a cross-section thereof. As shown in FIG. 2, the guide pins 13 are disposed in a pair of V grooves 11a formed on the optical waveguide substrate 11.

Referring to FIG. 3, in a state immediately before the optical connector 1 is coupled to the optical waveguide substrate 11, ends of the guide pins 13 of the optical waveguide substrate 11 are started to be inserted into a pair of guide grooves 6b of the adapter 4 of the optical connector 1.

Figure 4A:
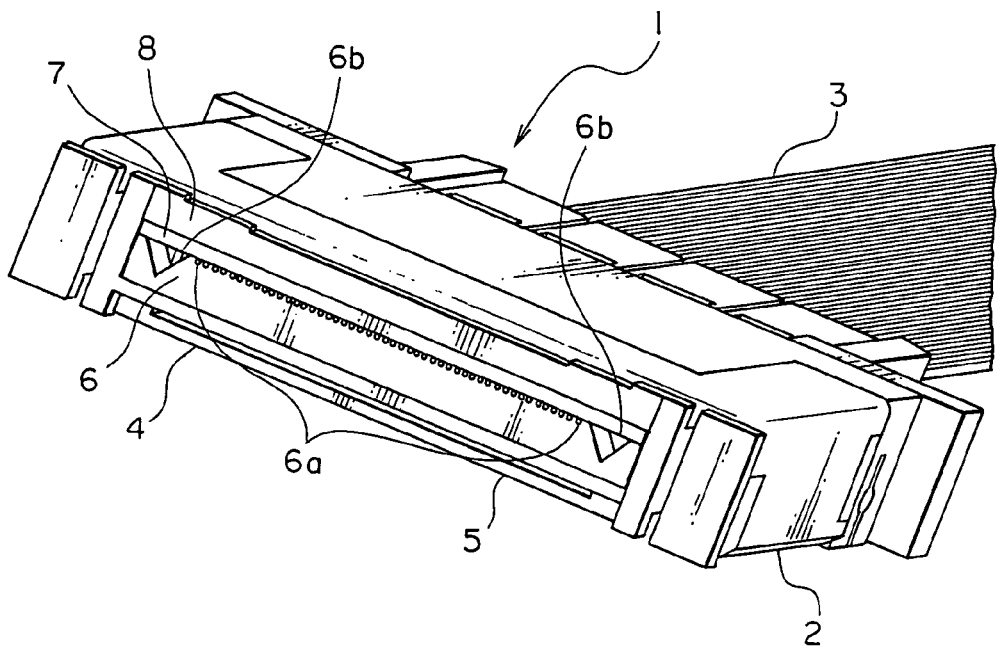
FIG. 4A is a front perspective view of a whole of the optical connector.
Figure 4B:
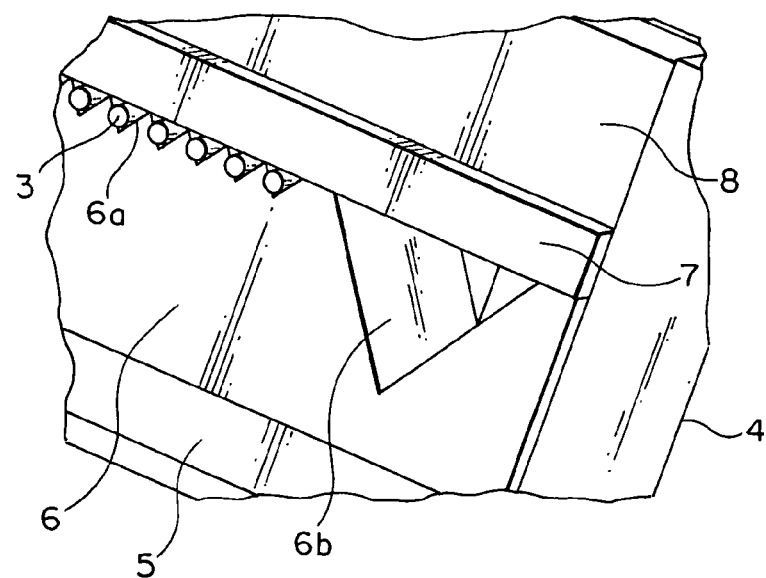
FIG. 4B is an enlarged view of a characteristic part in FIG. 4A.

Referring to FIGS. 4A and 4B, the adapter 4 will be described.

The details of the adapter 4 will later be described with reference to FIG. 9B. The adapter 4 comprises an adapter body 5, a silicon substrate 6, a holding plate 7, and a cover 8. The silicon substrate 6 has an upper surface provided with a number of positioning grooves 6a having a V-shaped section and formed at a center portion thereof with a predetermined pitch. The positioning grooves 6a serve to position the optical fibers 3. The optical fibers 3 are inserted into the positioning grooves 6a to be aligned. The silicon substrate 6 is provided with a pair of guide grooves 6b formed on left and right sides of the positioning grooves 6a to receive the guide pins 13. Each of the guide grooves 6b has a V-shaped section in a cross-section thereof.

Referring to FIGS. 5 to 7B, description will be made of the relationship between the plug 2 and the adapter 4 of the optical connector 1.

Figure 5:
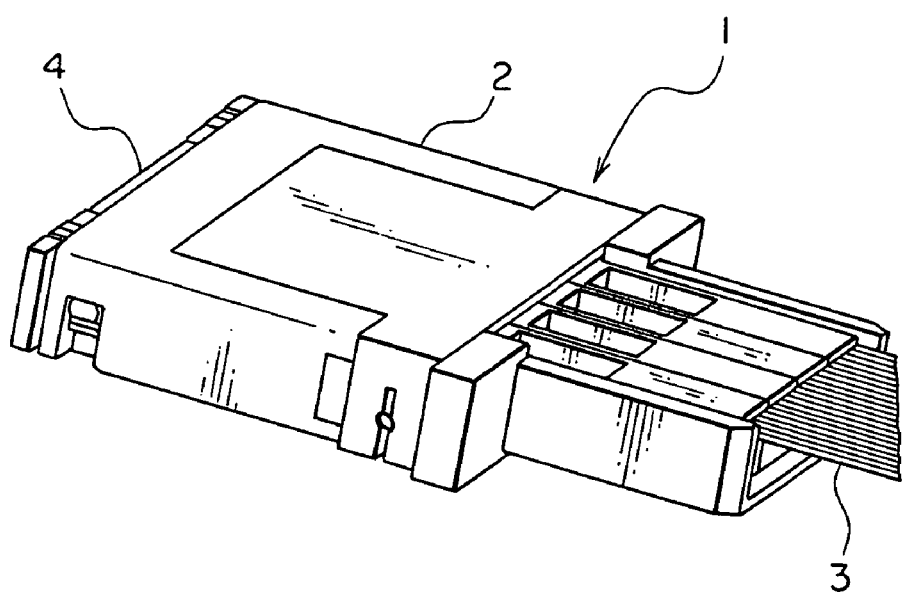
FIG. 5 is a perspective view of the optical connector alone.
Figure 6:
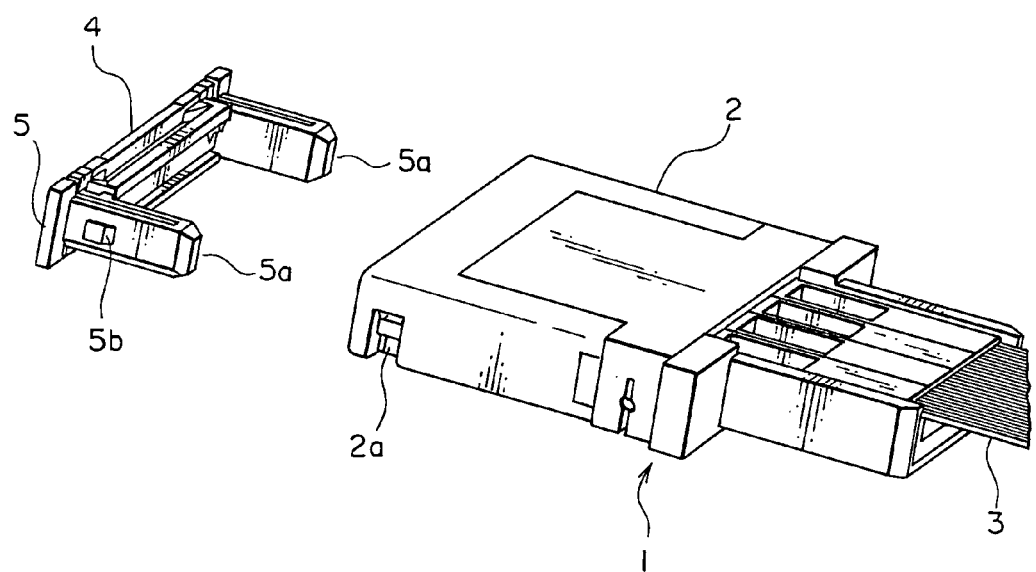
FIG. 6 is a perspective view of the optical connector when an adapter is removed from a plug.

In FIG. 5, the adapter 4 is attached to the plug 2 to form the optical connector 1. As shown in FIG. 6, the adapter 4 is removable from the plug 2.

The plug 2 is provided with a pair of through holes 2a formed on left and right sides of one end as an adapter receiving end to serve as engaging portions. The adapter body 5 of the adapter 4 is provided with a pair of guide portions 5a formed on left and right sides of a rear surface thereof and extending rearward. Each of the guide portions 5a is provided with a protrusion 5b.

Figure 7A:
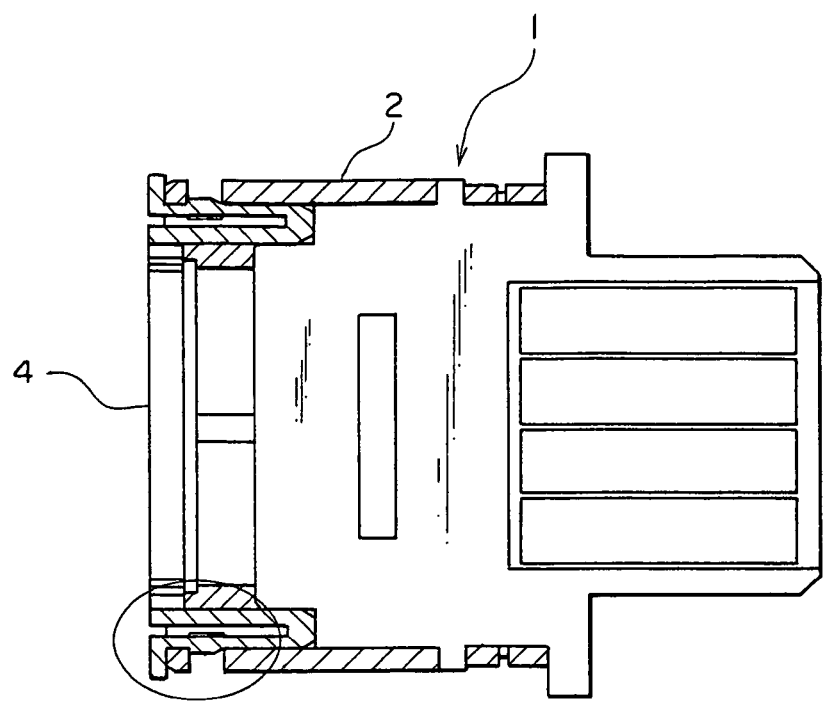
FIG. 7A is a sectional view of a whole of the optical connector.
Figure 7B:
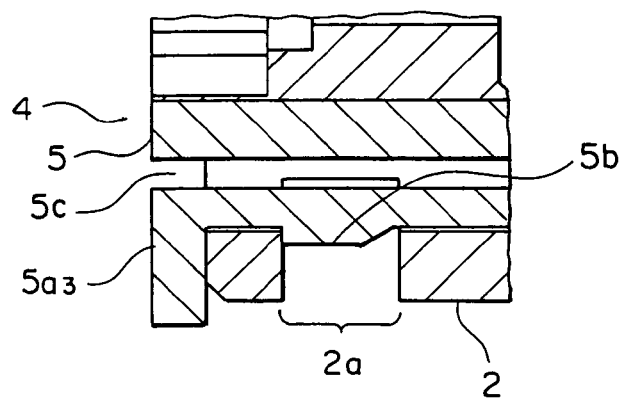
FIG. 7B is an enlarged view of a characteristic part in FIG. 7A.

Referring to FIGS. 7A and 7B, the protrusions 5b of the adapter body 5 are engaged with the through holes 2a of the plug 2, respectively. The details will later be described with reference to FIGS. 9A and 9B.

Figure 8:
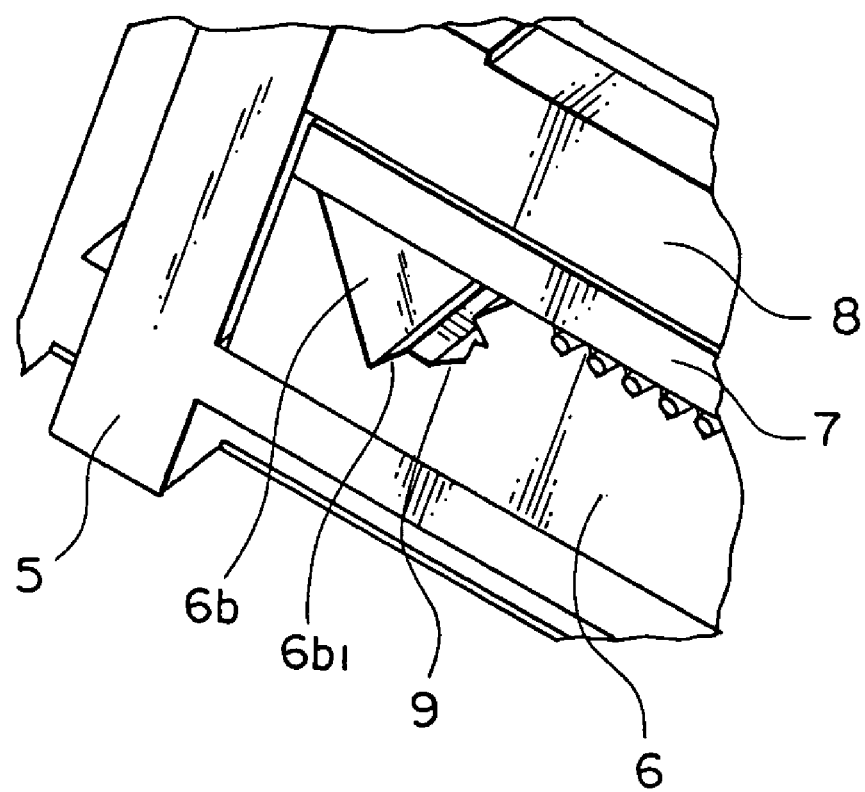
FIG. 8 is an enlarged perspective view of a part of the optical connector for describing an example of a damage.

Referring to FIG. 8, description will be made of an example of a damage of the optical connector 1.

When the end of the guide pin 13 of the optical waveguide substrate 11 is not inserted at the center of the guide groove 6b of the adapter 4 but collides with a slightly outside position of a slope or ramp 6b1 of the guide groove 6b, the slope 6b1 is assumed to be damaged as shown in the figure. In FIG. 8, a damaged portion is depicted by a reference numeral 9.

Upon occurrence of the damaged portion 9, only the adapter 4 is replaced by a new adapter. In other words, the plug 2 need not be replaced by a new plug.

Figure 9A:
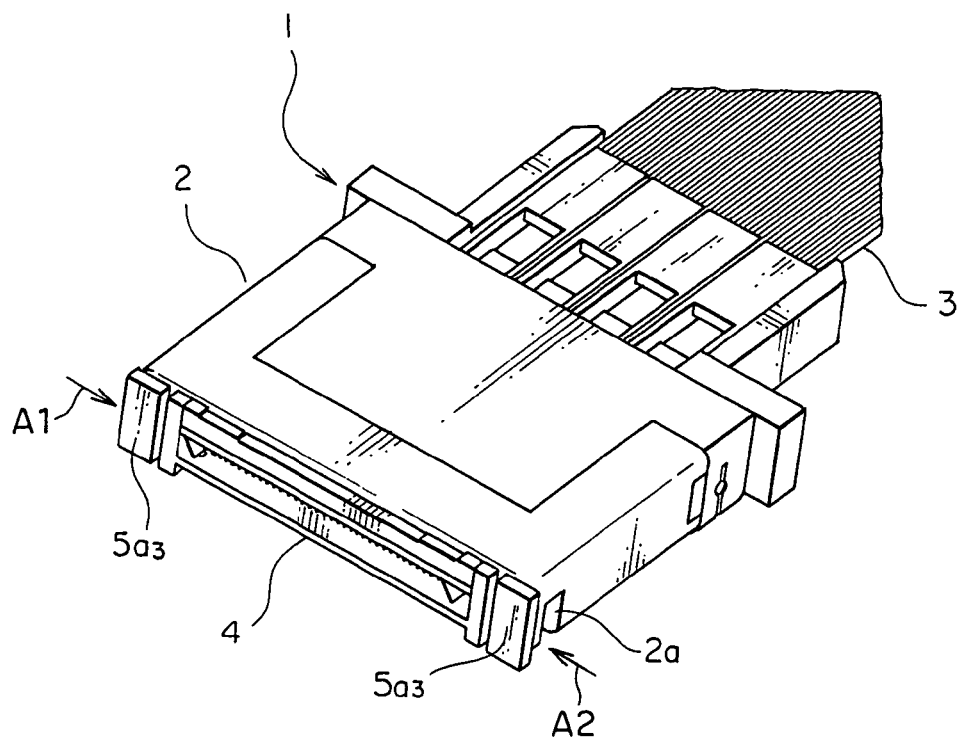
FIG. 9A is a perspective view for describing an operation of attaching and removing the adapter from the optical connector.
Figure 9B:
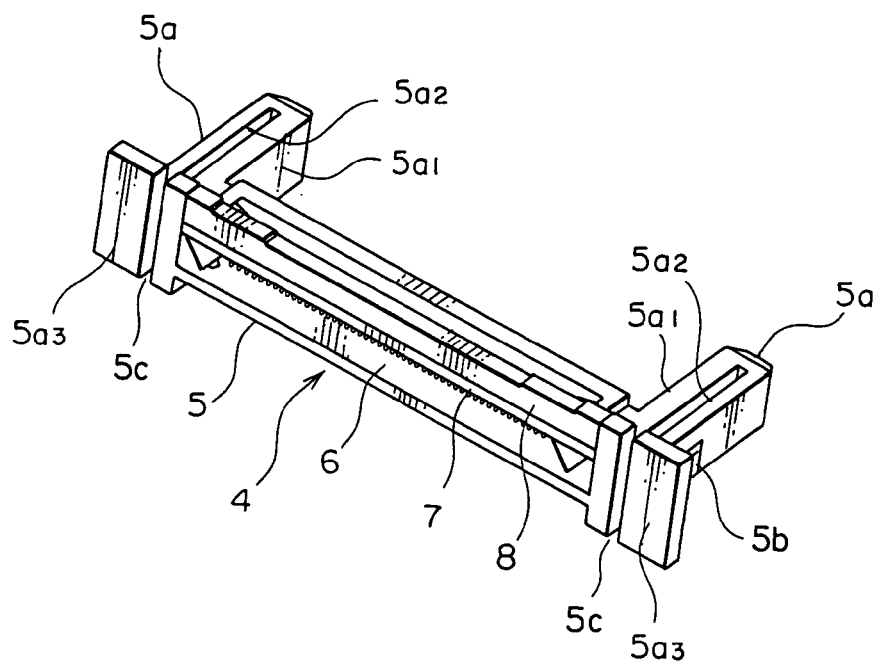
FIG. 9B is a perspective view for describing the adapter removed from the optical connector.

Referring to FIGS. 9A and 9B, description will be made of a structure of the adapter 4 and an operation of attaching and removing the adapter 4.

The silicon substrate 6 is mounted to the adapter body 5 of the adapter 4. On the silicon substrate 6, the holding plate 7 is placed. Further, the cover 8 is put on the holding plate 7. By an elastic member (not shown) formed on the cover 8, the upper surface of the silicon substrate 6 and a lower surface of the holding plate 7 are continuously kept in contact with each other. Therefore, precise center alignment of each optical fiber 3 is maintained. In this respect, Japanese Unexamined Patent Application Publication (JP-A) No. 2004-118031 discloses a similar structure.

The guide portions 5a are formed on the rear surface of the adapter body 5 on left and right sides thereof. Each of the guide portions 5a has an inner guide portion 5a1, an outer guide portion 5a2 connected to the inner guide portion 5a1 to form a generally U shape, and a manual operating portion 5a3 formed on a front side of the outer guide portion 5a2. The protrusion 5b is formed on an outer surface of the outer guide portion 5a2. Between the inner and the outer guide portions 5a1 and 5a2, a gap 5c is formed so as to allow elastic deformation of the outer guide portion 5a2.

Next, description will be made of an operation of attaching the adapter 4 to the plug 2. The operating portions 5a3 are pushed by two fingers in predetermined directions (depicted by arrows A1 and A2) in FIG. 9A. Then, the outer guide portions 5a2 are elastically deformed towards the center. In this state, the guide portions 5a of the adapter body 5 are inserted inward from the front side of the plug 2. Thereafter, the two fingers are released from the operating portions 5a3. Then, the outer guide portions 5a2 are restored to their original positions. As a consequence, the protrusions 5b formed on the outer guide portions 5a2 are engaged with the through holes 2a of the plug 2, as shown in FIG. 7B.

The operation of removing the adapter 4 from the plug 2 is reverse to the above-mentioned operation of attaching the adapter 4 to the plug 2.

Although this invention has thus far been described in conjunction with the preferred embodiment thereof, it will readily be possible for those skilled in the art to put this invention into practice in various other manners without departing the scope of the appended claims. Although the description has been made about the case where the connector body is a plug, the connector body may be a receptacle. As well as the above-mentioned connection of a plurality of optical fibers, a single optical fiber can be connected also as will readily be understood.

What is claimed is:

1. An optical connector for connecting an optical fiber to a mating object having a pair of guide members, the optical connector comprising:

a connector body fixed to the optical fiber; and an adapter removably attached to the connector body, the adapter having a positioning groove for positioning an end portion of the optical fiber and a pair of guide grooves adapted to receive the guide members, respectively, wherein the adapter comprises a pair of guide portions which are opposite to each other in a predetermined direction and guided by the connector body to be inserted into and removed from the connector body, wherein each of the guide portions includes:

an inner guide portion;

an outer guide portion which is connected to the inner guide portion and faced to the inner guide portion in the predetermined direction with a gap left between the inner guide portion and the outer guide portion, the outer guide portion being elastically deformable in the predetermined direction with respect to the inner guide portion, and an operating portion connected to the outer guide portion, wherein the connector body comprises an engaging portion which is faced to the outer guide portion, and wherein the outer guide portion comprises a protrusion which is engaged with and disengaged from the engaging portion when the adapter is attached to and removed from the connector body.

2. The optical connector according to claim 1, wherein the operating portion protrudes from the connector body in the predetermined direction.

3. The optical connector according to claim 1, wherein the adapter comprises:

an adapter body connecting the guide portions to each other; and a silicon substrate mounted to the adapter body, the positioning groove being formed on one surface of the silicon substrate.

4. The optical connector according to claim 3, wherein the adapter further has a center alignment structure for pressing the optical fiber against the positioning groove to align the optical fiber.

5. The optical connector according to claim 4, wherein the center alignment structure comprises:

a holding plate faced to the one surface of the silicon substrate; and a cover urging the holding plate towards the silicon substrate.

6. The optical connector according to claim 1, wherein the positioning groove has a V-shaped section.

7. The optical connector according to claim 1, wherein each of the guide members has a circular section and each of the guide grooves has a V-shaped section.

* * * * *